US007723677B2

(12) United States Patent
Ramiro Arcas et al.

(10) Patent No.: US 7,723,677 B2
(45) Date of Patent: May 25, 2010

(54) WIDE RANGE, VERY HIGH RESOLUTION DIFFERENTIAL MOBILITY ANALYZER (DMA)

(75) Inventors: Emilio Ramiro Arcas, Madrid (ES); Angel Rivero Jimenez, Madrid (ES)

(73) Assignee: Ramen, S.A., Madrid (SE)

( * ) Notice: Subject to any disclaimer, the term of this patent is extended or adjusted under 35 U.S.C. 154(b) by 483 days.

(21) Appl. No.: 11/826,654

(22) Filed: Jul. 17, 2007

(65) Prior Publication Data

US 2008/0017795 A1 Jan. 24, 2008

(51) Int. Cl.
*B01D 59/44* (2006.01)

(52) U.S. Cl. .......................................... 250/283; 250/293

(58) Field of Classification Search ................. 250/283, 250/292, 293; 356/338, 438; 324/452
See application file for complete search history.

(56) References Cited

U.S. PATENT DOCUMENTS 5,117,190 A * 5/1992 Pourprix ..................... 324/452
7,298,486 B2 * 11/2007 Wang et al. ................. 356/438
7,626,161 B2 * 12/2009 Labowsky et al. .......... 250/283
2006/0146327 A1 * 7/2006 Wang et al. ................. 356/338
2007/0044580 A1 * 3/2007 Arcas et al. ................ 73/865.5
2007/0272847 A1 * 11/2007 Labowsky et al. .......... 250/283

* cited by examiner

*Primary Examiner*—David A Vanore
*Assistant Examiner*—Johnnie L Smith
(74) *Attorney, Agent, or Firm*—Birch, Stewart, Kolasch & Birch LLP

(57) ABSTRACT

The present invention consists of a differential mobility analyzer (DMA) intended for achieving the electric field conditions necessary so that it has an component opposite to the drag flow. This electric field component opposite to the drag flow causes the main electric field to be not perpendicular to the velocity field of the drag flow but oblique. Under these conditions, it is possible to increase the resolution of the device, thus reducing the threshold of errors in the detection of the type particle injected in the analyzer. This invention is characterized by the arrangement and nature of the electrodes intended for obtaining the oblique electric field. The invention also comprises the use of this analyzer as part of a device which comprises it, giving rise to an assembly combining the efficiency of the analyzer of the state of the art with the high resolution of the analyzer of the invention.

25 Claims, 10 Drawing Sheets

WIDE RANGE, VERY HIGH RESOLUTION DIFFERENTIAL MOBILITY ANALYZER (DMA)

OBJECT OF THE INVENTION

The present invention consists of a differential mobility analyzer (DMA) intended for achieving the electric field conditions necessary so that it has an component opposite to the drag flow. This electric field component opposite to the drag flow causes the main electric field not to be perpendicular to the velocity field of the drag flow but oblique.

Under these conditions, it is possible to increase the resolution of the device, thus reducing the threshold of errors in the detection of the type particle injected in the analyzer.

This invention is characterized by the arrangement and the nature of the electrodes, which are intended for obtaining the oblique electric field.

The invention also comprises the use of this analyzer as part of a device which comprises one of its components, wherein the other component is a differential mobility analyzer of the state of the art with the capacity of discriminating for several values of electric mobility. The assembly combines the efficiency of the analyzer of the state of the art with the high resolution of the analyzer of the invention.

BACKGROUND OF THE INVENTION

Differential mobility analyzers are known based on establishing a drag flow with high Reynolds numbers and the smallest possible degree of turbulence through which a target particle is made to cross.

This particle is injected in a perpendicular direction with an electric charge obtained after an ionization stage.

The presence of an electric field perpendicular to the flow direction drives the particle through the cross flow to a greater or lesser degree given the value of electric mobility which depends on the charge and diameter of the particle among other parameters.

Given that the particle is dragged downstream by the main drag flow, the greater or smaller velocity of the particle according to its electric mobility will give rise to the point on which it strikes on the other side of where it has been injected being located at a greater or smaller distance.

The impact at a greater or smaller distance may be read by means of a multisensor which detects the exact location of this impact in the longitudinal coordinate, the one that follows the flow. The electric mobility of the particle is a function of the distance where the impact occurs.

Another alternative is that of incorporating an exit slot. If this slot is located at the distance at which the impact of the target particle occurs, that which is intended to be detected, the target particle entering the mobility analyzer will cross it according to the trajectory reaching said slot such that the particle may be extracted.

Thus, not only its presence is detected but it can be taken via devices of greater accuracy which reduce the threshold of uncertainty on the value of its electric mobility.

This is the way in which the increase of resolution has been carried out in the state of the art, the incorporation of devices at the exit of the analyzer; in particular, PCT patent application with number 2005/ES070121 is mentioned.

Publications such as ["Drift differential mobility analyzer", J. Aerosol Sci., Vol. 29, No. 9., pp. 1117-1139, Ignacio G. Loscertales], wherein the influence on the resolution of the DMA of the presence of an oblique electric field (E), such that, apart from the transverse component $E_y$ of the field, there is a non-zero component $E_x$ (with regards to the main drag flow) and in the direction opposite to said flow, are known.

This study is a theoretical analysis where the increase of the resolution of the DMA is linked according to the oblique electric field E, in particular of its non-zero component $E_x$.

The mathematical development of this analysis utilizes a dimensional variables X, η. These a dimensional variables are defined as =x/b, η=y/b, where x is the non-zero component that follows the drag flow, y is the coordinate transverse to the flow, and b is the separation distance between the two walls between which the trajectory of the particle is established. By denoting the electric field (E) according to the a dimensional variables, now its components are expressed as E=(f, fη).

The results of this analysis determine that the error reduction factor is of the order of $$\left(\frac{E_x}{E_y}\right)^{(1/2)}$$

In particular, when the electric field is expressed according to the coordinates X, η, then the reduction factor may be evaluated from the value $$K = \int_0^1 \left(\frac{E_x(\eta)}{E_y(\eta)}\right) d\eta$$

such that the increase factor on the resolution of a DMA utilizing the oblique electric field with regards to another that does not may be expressed as $1/\sqrt{2K}$.

This expression means that the increase of the value of K reduces the error reduction factor; and also, that the resolution may be, at least theoretically, increased without an upper elevation as much as desired. This decrease is proportional to the non-zero component $E_x$, and the greater the inclination angle of the electric field (E) the larger the latter will be.

The detailed study of this factor K and of the equations leading to its deduction also allows to ensure that the resolution increase is only obtained if $E_x$ is counter-currently oriented.

This study is focused on the mathematical analysis that leads to said conclusions and does not explain how this oblique electric field may be obtained in practice. However, an attempt to obtain a device with a narrow oblique electric field (E) region which utilizes a pair of grids parallel to one another, arranged oblique in the midst of a drag flow, the work area being limited to the places between the grids in which the oblique electric field (E) is ensured, giving rise to very bulky devices in which the effective volume is very reduced, is known. Another serious drawback it has is the interference of the wake of the grids on the drag flow.

The present invention defines a device utilizing properly selected and configured electrodes such that the whole of the analysis region, except for edge effects, has an oblique field (E) without distortions of the latter or of the drag flow as it does not include elements immersed in the midst of the flow.

DESCRIPTION OF THE INVENTION

The invention consists of an electric mobility analyzer wherein the resolution is increased by the use of an oblique electric field (E) obtained by an adequate design of the electrodes generating that field.

This analyzer or DMA consists of a device that at least comprises an assembly of sidewalls between an entry and an exit for the passage of the main drag flow across its interior. The sidewalls and an entry-defining surface and another exit-defining surface determine a control volume inside of which it is necessary to ensure the adequate conditions both of the drag flow and of the electric field (E) causing the acceleration of the particle.

The Reynolds number of the main drag flow may be adjusted to the particle size such that the turbulence levels are lower than that required by the measurement.

The configuration of the DMA may be cylindrical or flat, that is, it is defined only with two dimensions, at least as far as the region of study is concerned.

When a flat configuration is utilized, the two variables to be considered are what will be called length and width. By the way it will be graphically depicted in the embodiment examples of the invention, the length is the vertically-oriented variable; and when the configuration is cylindrical, the two variables to be considered are the longitudinal and the radial direction (arranged horizontal).

In the case of the flat configuration, the two walls between which the trajectory is established are two parallel planes, and in the cylindrical configuration, the two walls correspond to two concentric cylinders.

To simplify and because the best way of embodying the invention will correspond to the flat configuration, from now on the vocabulary associated with said configuration will be used, the description for the cylindrical configuration being valid just by applying the change of coordinates.

Given the control volume limited by walls, two facing one another, and in the case of the flat configuration, two more sidewalls closing the space, the injection of the particle is carried out through the side face in a given point at the entry of the control volume. Proximity is not relevant, it is simply deemed that the trajectory of the particle will head for the exit dragged by the main flow such that this downstream area is the area of interest.

An electric field oriented toward the opposite wall drives the injected particle toward with a velocity proportional to the value of the electric mobility of the particle. On the other side, an exit slit will be arranged at a longitudinally-measured distance corresponding to the impact point of a particle with the electric mobility of the target particle.

This electric field (E) is attained in the state of the art incorporating in each one of the faces an electrode and establishing a potential difference between both. The electric field (E) is parallel and oriented transverse to the main drag flow.

The essence of the invention entails modifying the electrodes so as to modify the orientation of the electric field $E=(E_x, E_y)$ so that it is oblique, giving rise to a non-zero component $E_x$ with a direction opposite to that of the main drag flow.

This change in the electrodes entails establishing a potential gradient $\nabla V$ in the direction of the main flow. This potential gradient $\nabla V$ is applied in each of the electrodes which are arranged on one and the other side; and in turn, a potential difference is assigned between both, for example by taking as a reference their upper ends.

If constant, potential gradients give rise to a variation of the potential with a linear behavior such that the lines of the electric field, even though oblique, are parallel in the control volume or at least in the region through which the particle are going to pass. This clarification is useful to exclude the distortion effects which are created in the regions close to the edges of the electrodes or in the entry and exit regions.

The potential gradient $\nabla V$ may be obtained by two methods: a first method, which will be termed continuous, utilizing for example resistive materials or coatings such that upon application of a potential difference between its ends it will give rise to a progressive potential drop along its length; or a second method, which will be termed discrete, using a plurality of conductors separated by insulators with decreasing potentials.

It is possible to obtain this decreasing potential either by means of potential dividers or by means of adequately-assigned, independent power supplies.

Even though most of the theory ensuring the increase of the resolution in the presence of electric fields with a non-zero component $E_x$ utilizes electric fields with parallel field lines, non-linear variations of the potential allow to create more complex oblique fields, for example so as to concentrate field lines in certain point or to make them divergent. These modifications may be useful for example to increase the resolution, discerning to a higher degree the electric mobility of the particle moving inside it.

The use of the analyzer described inside a bigger device which includes it is envisaged within this same invention. This device incorporates a DMA which is termed classic because it is of those envisaged in the state of the art mentioned by its publication number, the description and summary of which are included in this description by reference, for example with a multisensor, in charge of carrying out a continuous reading of a plurality of simultaneous readings; and in parallel, another high-resolution device with an oblique electric field.

Although this second high-resolution analyzer would be in parallel, they could share the transverse drag flows as their duplication is not required.

In this case, the deviation of the injection to the second high-resolution DMA or analyzer would allow to confirm if a positive or detection o the first DMA is true or false. The device resulting from this combination is considered to be part of the invention.

DESCRIPTION OF THE DRAWINGS

The present specification is complemented with a set of drawings, illustrative of the preferred example and never limiting the invention.

DETAILED DESCRIPTION OF THE INVENTION

Figure 1:
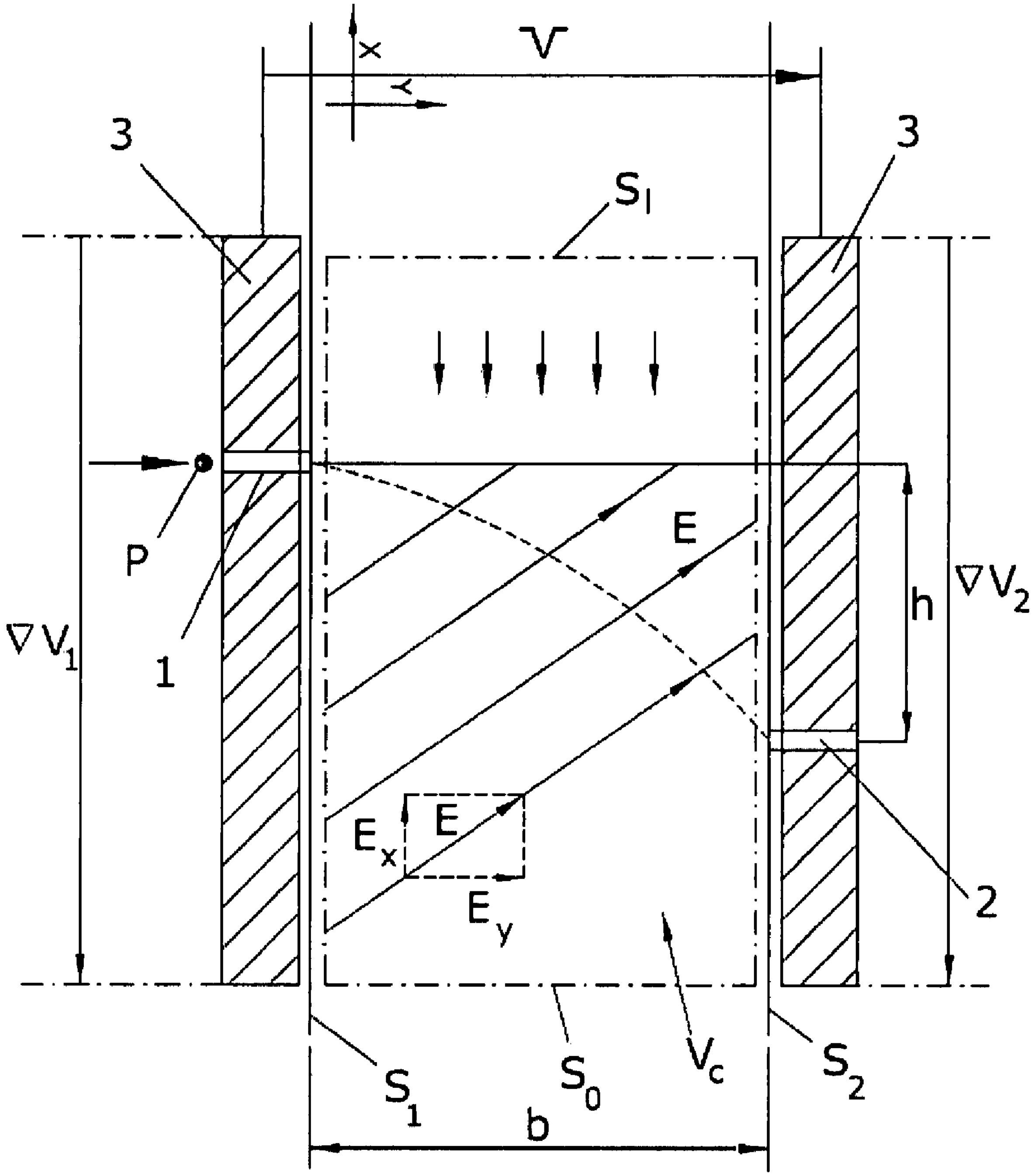
FIG. 1 shows a diagram of a differential mobility analyzer like that of the invention, shown as a section which could correspond to a region of a flat analyzer, although the cylindrical would be identical except that the variables would correspond to the cylindrical coordinates.

The invention is set forth in a more detailed manner with the aid of the figures, where a diagram of an example of the differential mobility analyzer made up of a side face ($S_1$) and an opposite face ($S_2$), is shown in FIG. 1. These faces ($S_1$, $S_2$), together with the entry and exit surfaces ($S_i$, $S_o$) of the main drag flow (v), define a control volume ($V_c$).

The main drag flow (v) is a gas flowing at a velocity (v), referenced with a small-caps "v", with a Reynolds number suitable to the particle size to be detected. According to the figure, the flow flows from the top to the bottom according to the longitudinal coordinate {x}.

An electrode (3) has been arranged on each one of the faces ($S_1$, $S_2$). The potential difference (U) between one and the other electrode (3) mainly determines the transverse component ($E_y$) of the electric field (E). This potential difference (U) has been taken at the upper ends of each electrode (3) by way of reference.

It is specified that the potential difference (U) is taken at the upper portion of the electrodes (3) because the potential varies along its length.

At each of the electrodes (3) there is a potential gradient ($\nabla V$) between its ends, which in the figures has been specified as $\nabla V_1$ and $\nabla V_2$, indicating the potential drop along the transverse coordinate {y}. For example, if the length of the electrodes (3) is the same and it is verified that $\nabla V_1 = \nabla V_2$, then the potential difference between the lower ends of one or the other electrode (3) will also be equal to the potential difference (U) between the upper ends.

The result from this configuration is that of a constant electric field (E), where $E=(E_x, E_y)$, with parallel and oblique field lines, that is, it is verified that $E_x$ is not zero.

These conditions will be true in the inner region between the electrodes (3), except for the edge effects of the electrodes (3) where the field lines are distorted. The work region of the DMA of the invention according to this example is that corresponding to the parallel field lines where, nevertheless, some type of distortion on said lines is possible for the purpose for example of finding the concentration or divergence thereof at a point of interest. An example of distortion on the field lines is obtained when the potential gradients ($\nabla V_1$, $\nabla V_2$) are not equal in one and the other electrodes (3).

An injection slot (1) of injection of the particle (P) inside the analyzer, injection which can be carried out with or without entry flow, is shown in this same FIG. 1. The trajectory which will be followed by the particle (P), if the conditions established in the flow (v) and the electric field (E) are such that it is verified for the electric mobility of the particle (P) that the arrival point to the second wall ($S_2$) corresponds to the position of the upper exit slot (2), is indicated by means of a dashed line.

In this example, apart from the transverse component ($E_y$) being established so that, before a drag flow (v) and a certain electric mobility of the particle (P), a trajectory with an arrival point at a longitudinal distance (h), vertically represented as a height, allowing the particle (P) to exit through the upper exit slot (2) is obtained, it will be necessary to set the value of $E_x$ to increase the resolution by the order necessary so as to reduce the error up to a preset elevation following expressions such as those included in the section dedicated to the state of the art.

This variation of $E_x$ may modify the trajectory; therefore, this change will entail resetting $E_y$. These settings are carried out by acting on the potentials applied at the electrodes (3).

Figure 2A:
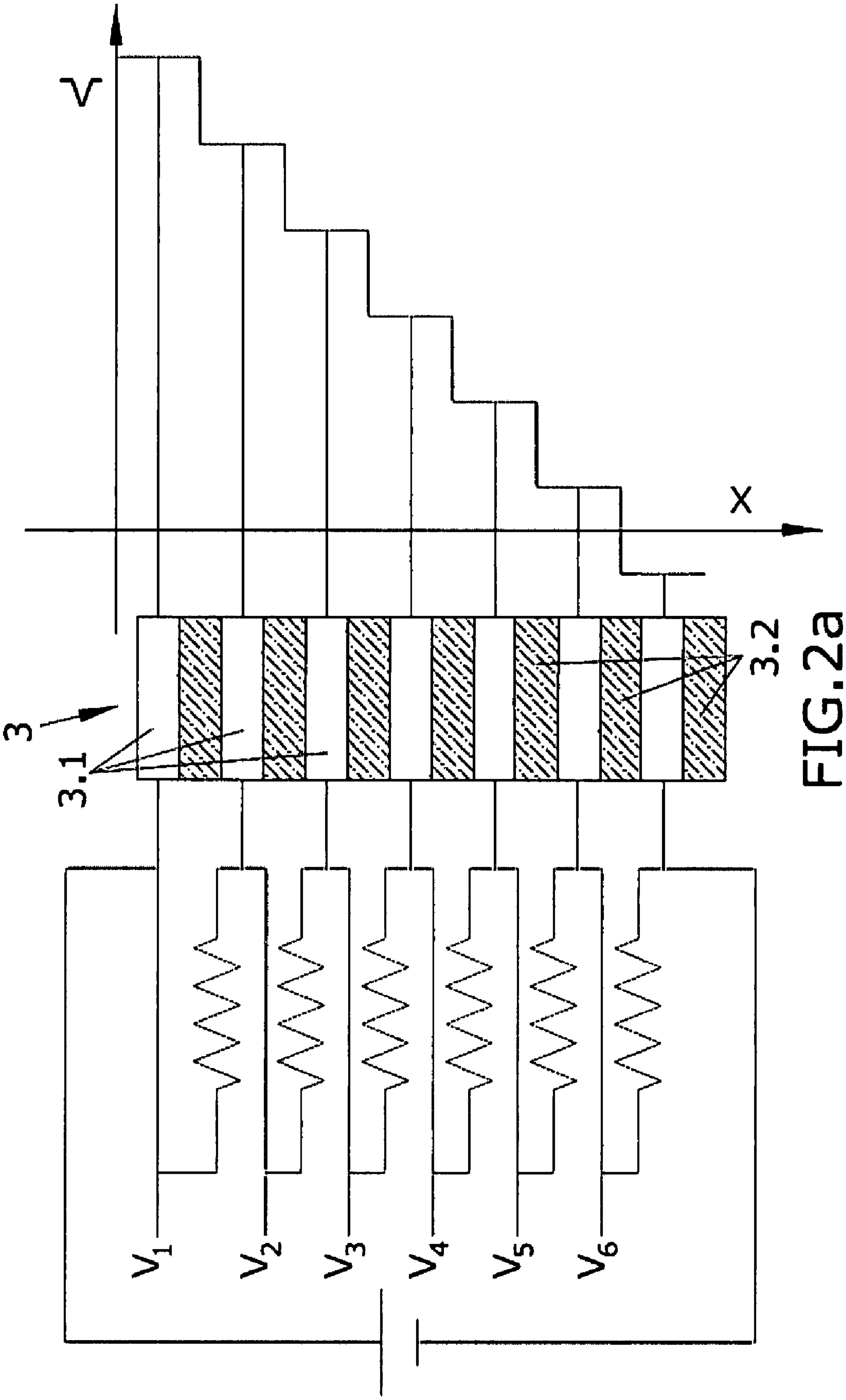
FIGS. 2*a* and 2*b* are embodiment examples of an electrode made up of a plurality of equally-spaced conductors separated by insulators so as to give rise to a potential gradient according to the discrete case.
Figure 2B:
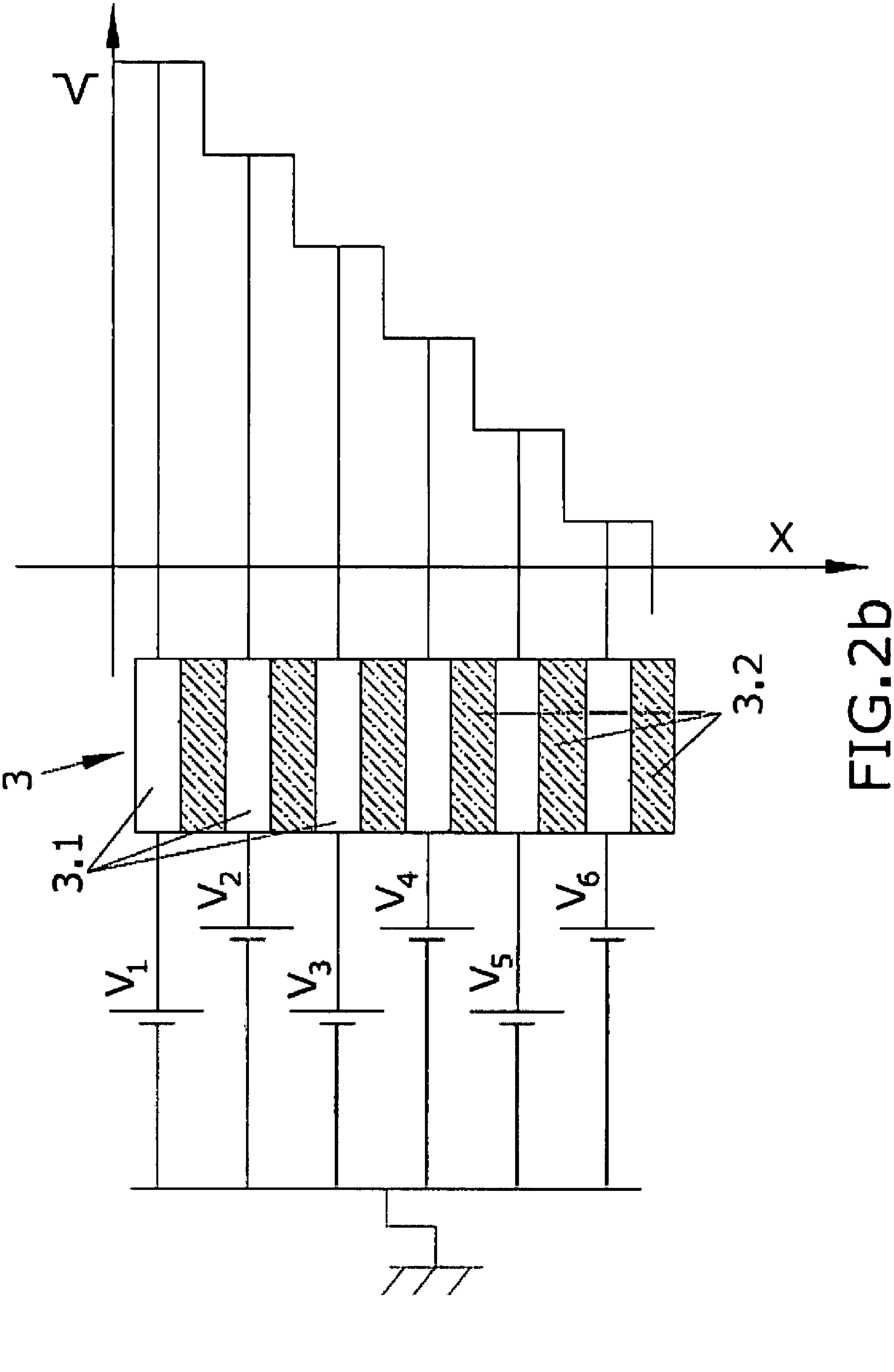

FIGS. 2*a* and 2*b* schematically show the configuration of an electrode (3) made up by a plurality of conductors (3.1) separated from one another by means of an insulator (3.2). Each of these conductors (3.1) may be placed at a different potential. The insulator (3.2) does not have to be an independent part such as conductor (3.1), but it may be a common substrate emerging from the conductors (3.1) giving rise in the preferred case to a smooth surface on the faces ($S_1$, $S_2$) delimiting the control volume ($V_c$).

In the example shown in FIG. 2*a*, a single power supply is utilized such that, by means of a voltage divider represented with a sequence of resistances in series, potentials $v_1$, $v_2$, $v_3$, $v_4$ . . . are obtained which follow a staggered drop such as is depicted in the graph arranged adjacent to its right. This staggered drop of the potential defines a discrete potential gradient $\nabla V$ such that, if this electrode (3) is the one used in the analyzer of the invention, it allows to generate an oblique electric field (E). The discrete jumps of the potential only generate a non-homogeneous field in a narrow region close to the faces ($S_1$, $S_2$). In this same region close to the wall is where the limit layer corresponding to the drag flow (v) exists, it being a region not affecting the effective work area basically located inside the control volume ($V_c$).

Although the staggered potential drop has been attained by means of a voltage divider, another means for obtaining the potential gradient ($\nabla V$) is possible. Generically, in FIG. 2*b* it has been indicated how each conductor (3.1) may be independently fed, it being able to establish its potential in an exteriorly controlled manner. In this case it would be possible to define non-uniform potential jumps such that, by not resulting in a constant gradient, the electric field (E), although oblique, would show a distortion that could be adequately pre-selected so as to achieve for example the concentration or divergence of field lines in some region. The divergence or convergence of the field lines may for example affect the resolution of the analyzer.

Figure 3:
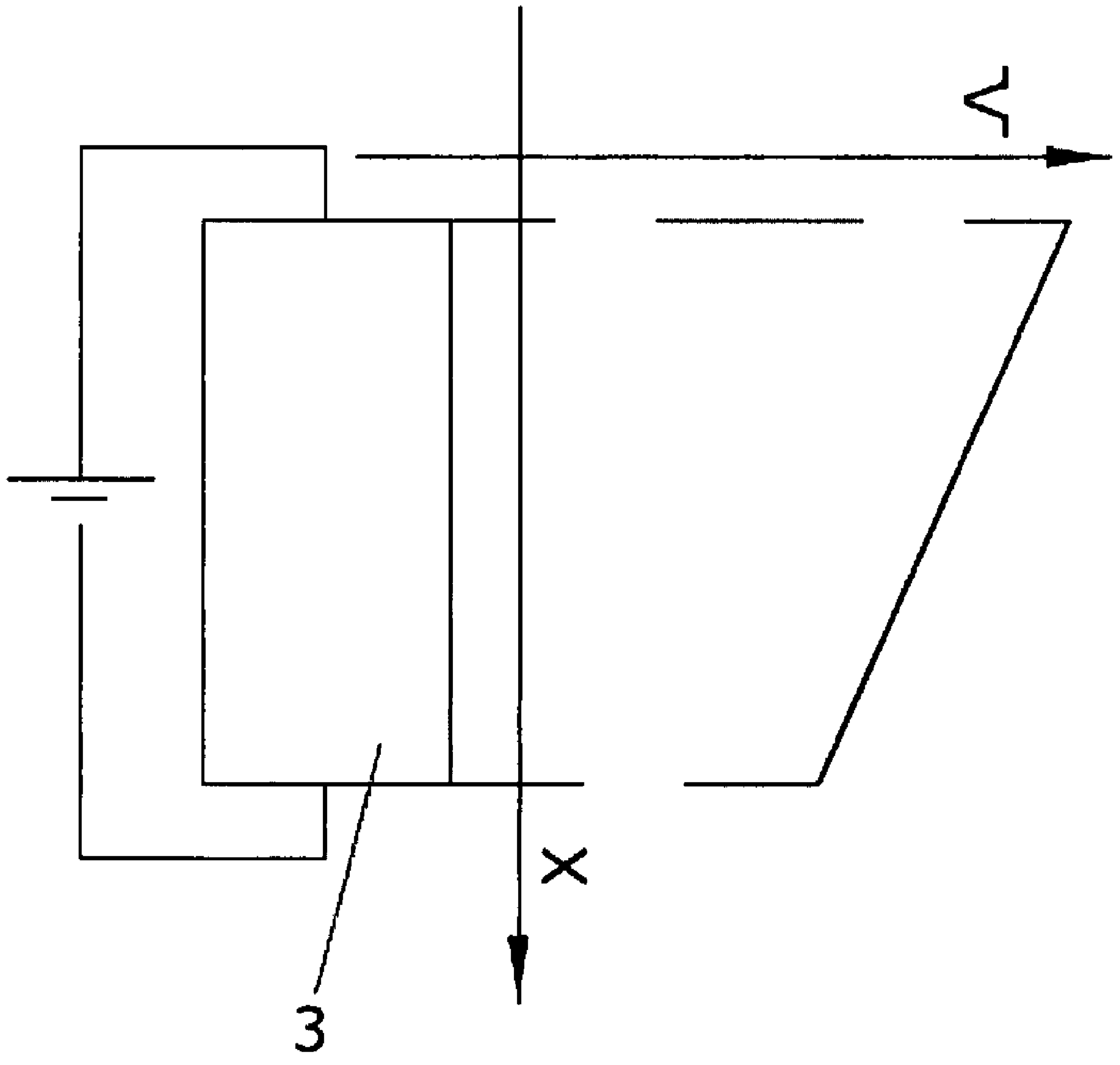
FIG. 3 is an schematic representation of an electrode with resistive behavior defining a continuous potential gradient.

An electrode (3) made up of a resistive element is schematically depicted in FIG. 3. This resistive element, by being fed at its ends by means of an power supply, shows a constant potential drop. This drop is continuous; therefore, its use would give rise to an oblique field without distortions near the walls ($S_1$, $S_2$). The right graph shows the potential function (V) with a linear behavior such that the gradient would be constant throughout its length.

It would also be possible to establish continuous variations in the gradient by varying the resistance in each point with regards to its longitudinal coordinate, for example with variations of the section or of the properties of the resistive material used.

The way of obtaining this type of electrodes (3), by way of example, is by means of the use of resistive paints, projections, or deposits on the inner walls of the analyzer. Semiconductors or resistive materials with which a part mountable on the sides themselves is configured may also be used, always endeavoring not to affect the drag flow (v). A way of obtaining its inclusion without modifying the flow (v) is to define a mortise serving as a housing ensuring that the electrode (3) serves as a wall limiting the control volume ($V_c$).

The use of projections, paints, or depositions of resistive materials so as to obtain a continuous electrode (3) is deemed of great interest given that it offers many advantages versus for example the use of detachable parts that may be incorporated in mortises or openings. Among the advantages, the simplicity of the whole, the ease of machining, the lack of leaks due to tightness faults, the incorporation of surfaces with a more complex geometric configuration stand out among others.

It is also possible to view the resistive electrode (3) with a continuous potential drop as the borderline case of the discrete electrode (3) where the change from conductor to insulator occurs in a distance tending to zero.

Calculations both of the potential (V) and of the electric field (E) have been carried out for the discrete and the continuous case. The discrete case is deemed valid if the disturbances of potential (V) do not deteriorate the precision of the electric field (E) and as a result the accuracy of the device.

Figure 4:
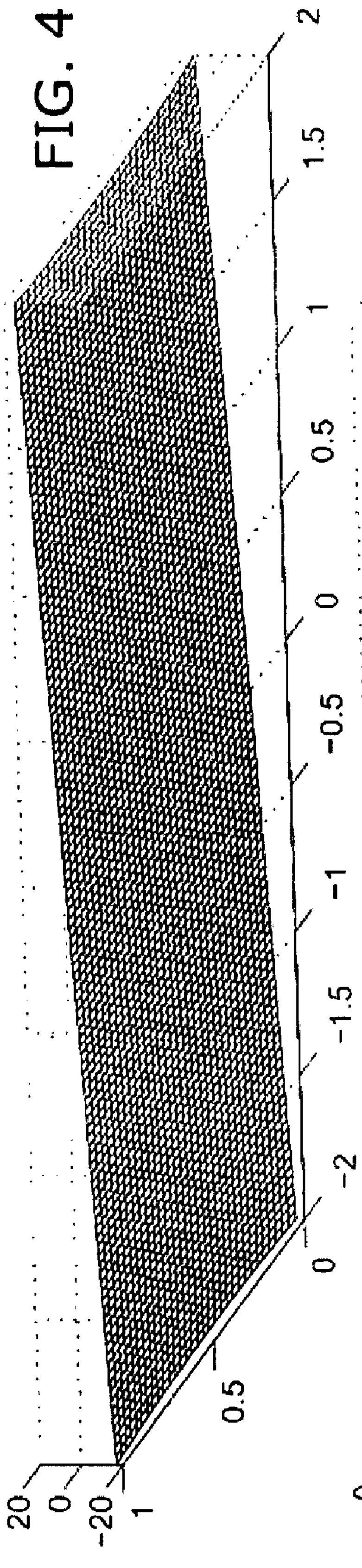
FIGS. 4, 5, and 6 are three perspective graphs depicting the electric potential (V) and the components $E_x$ and $E_y$ of the electric field (E) respectively in the section of the control volume ($V_c$) depicted in FIG. 1. The electrodes used, to which the graphs correspond to, are continuous.

FIG. 4 is a representation of the potential (V) expressed in parametric coordinates V=V(x,y) utilizing electrodes (3) with a constant potential drop. All graphs are normalized. The potential drop on both variables is checked. The electric field (E) will follow the maximum fall lines determined by the gradient operator.

Graphs 5 and 6 are components $E_x$ and $E_y$, respectively, components of the electric field (E). The effects of the edges are revealed in these graphs. Even though such variations are not appreciated in the potential function, they exist and the are thus displayed.

Figure 7:
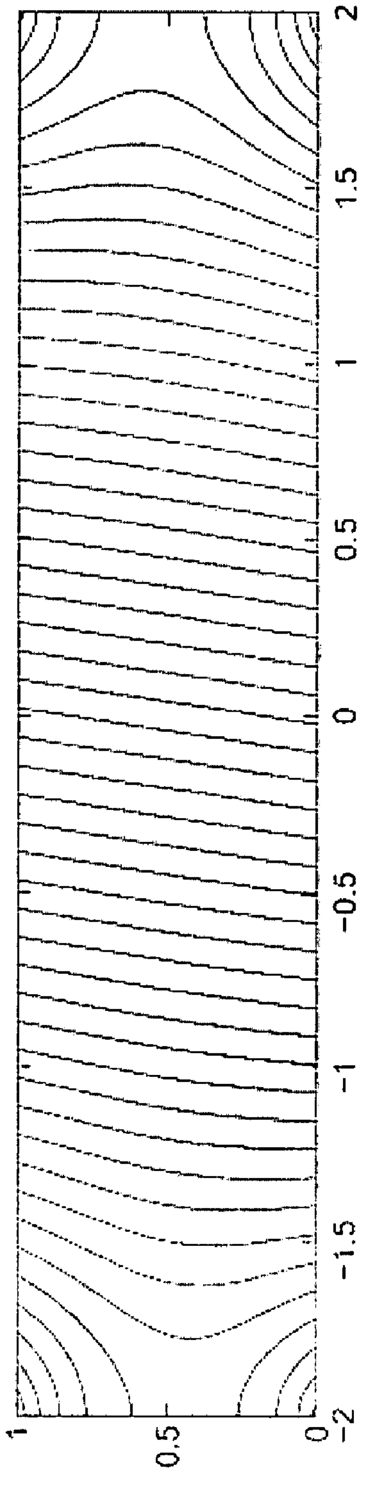
FIGS. 7, 8, and 9 are three contour graphs depicting the electric potential V and the level lines of the components $E_x$ and $E_y$ of the electric field (E) respectively in the section of the control volume ($V_c$) depicted in FIG. 1. Said representations correspond to the same case than FIGS. 4, 5, and 6.

FIG. 7 is a contour representation where the oblique lines of the electric potential (V) are displayed. These lines are those establishing the direction of the force field acting on the particle at each of the points of the domain. It is seen how there are edge effects at the entry and exit of the domain, but not on sidewalls ($S_1$, $S_2$) as the electrodes have a continuous potential drop.

Figure 5:
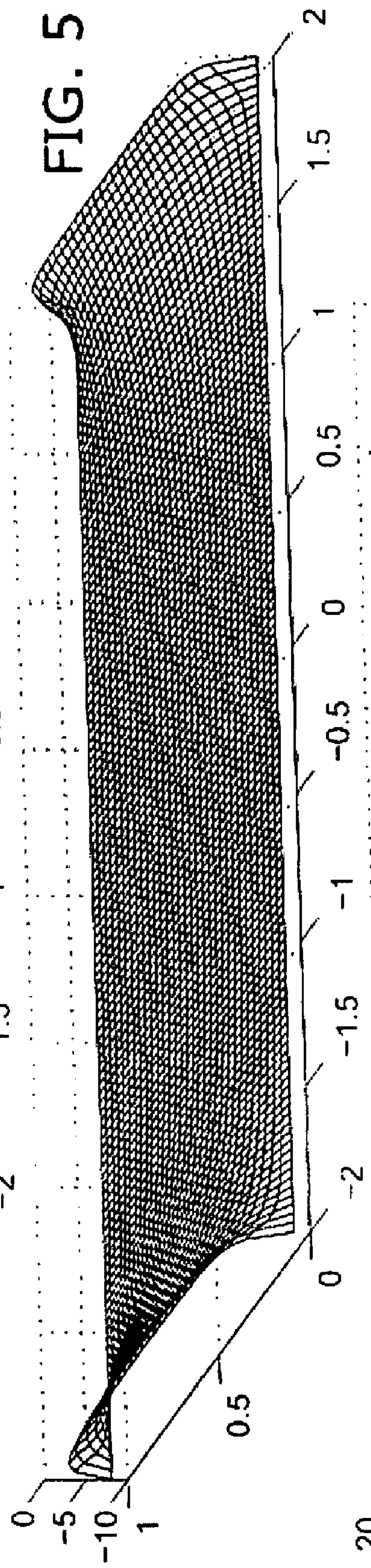
Figure 6:
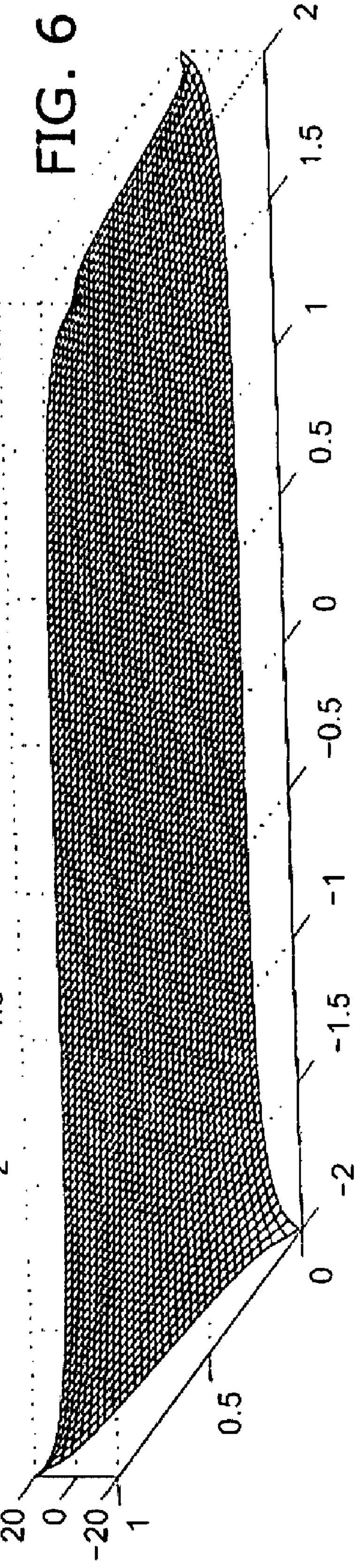
Figure 8:
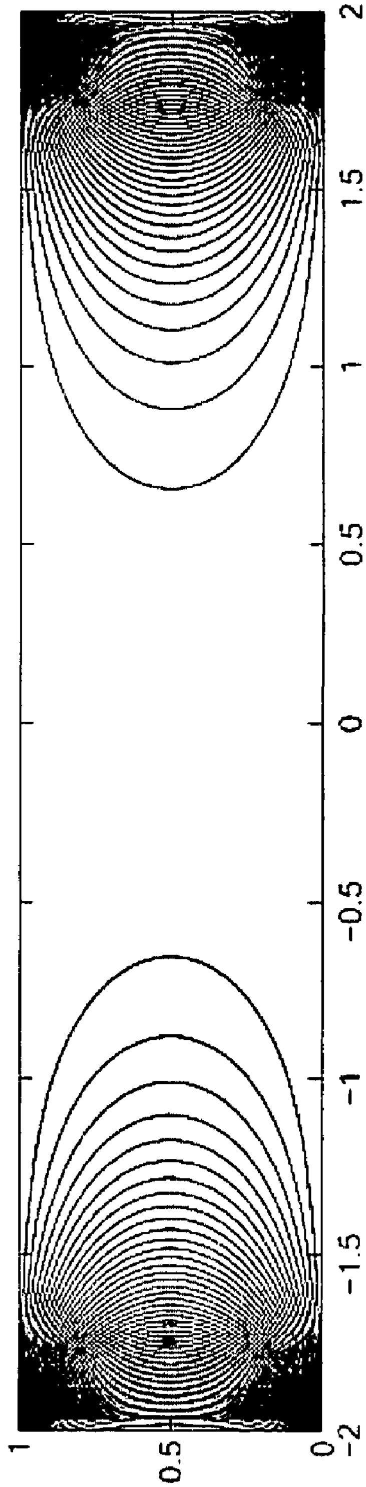
Figure 9:
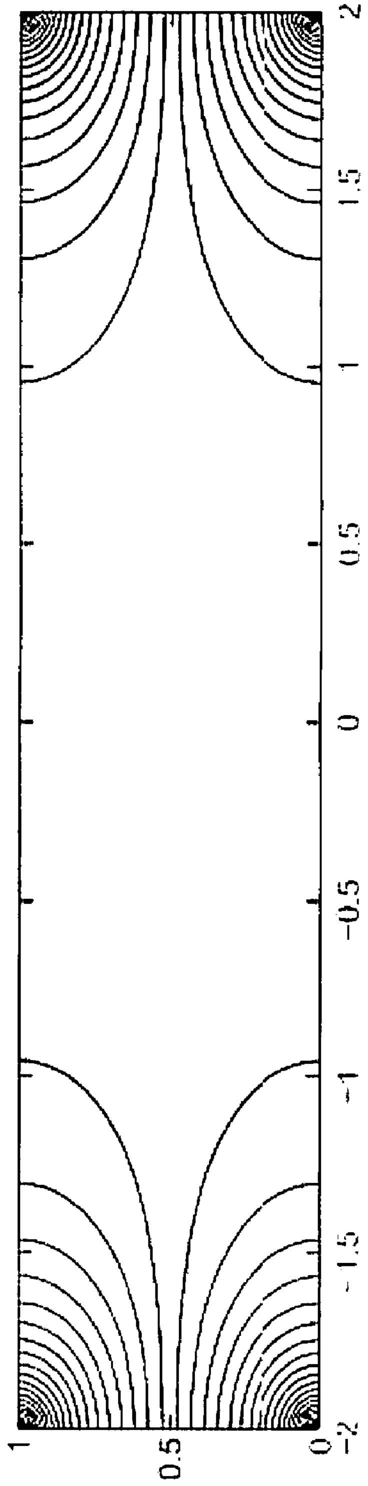

FIGS. 8 and 9 are contour representations of the scalar functions $E_x$ and $E_y$, components of the electric field (E), represented in the graphs of FIGS. 5 and 6 respectively.

Although this is the preferred case since a high-quality, oblique electric field (E) is obtained in a region remote from the entry and exit of the drag flow (v), it is possible to arrange an oblique field by also utilizing a finite number of conductors (3.1) separated by an insulator (3.2).

Figure 10:
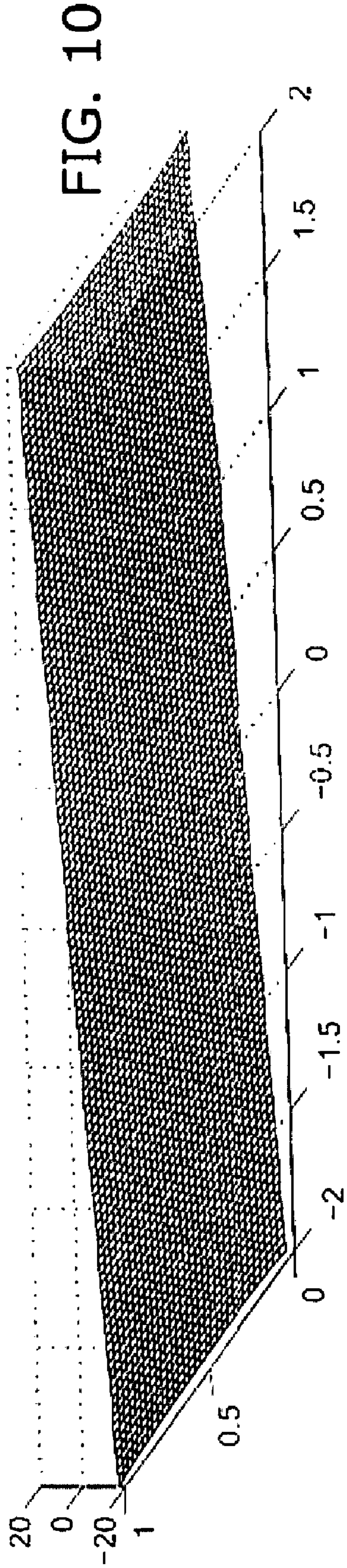
FIGS. 10, 11, and 12 are three perspective graphs depicting the electric potential (V) and the components $E_x$ and $E_y$ of the electric field (E) respectively in the section of the control volume ($V_c$) depicted in FIG. 1. The electrodes used, to which the graphs correspond to, are discrete.

FIG. 10 is a representation of the potential (V) obtained by means of these electrodes (3), the discrete case. Even though at first glance it seems a field similar to that depicted in FIG. 4, by means of a more thorough observation it is perceived at the edges that they do not follow a straight but slightly disturbed line.

Figure 11:
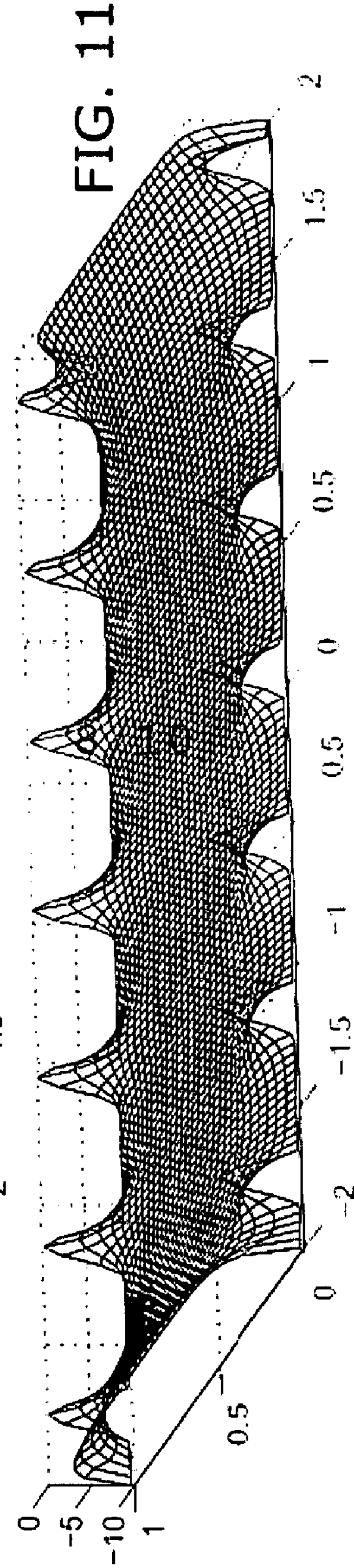
Figure 12:
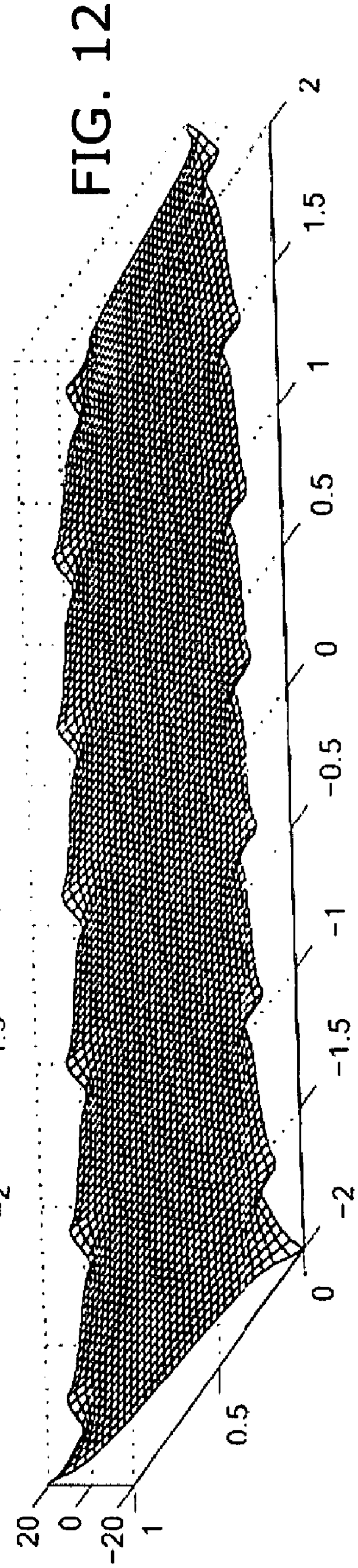

These disturbances are highlighted in FIGS. 11 and 12, where the components $E_x$ and $E_y$ of the electric field (E) calculated by means of partial derivatives of the gradient operator are depicted.

It is seen how a peak distorting the electric field (E) close to the faces ($S_1$, $S_2$) is presented in accordance with each electrode (3).

Figure 13:
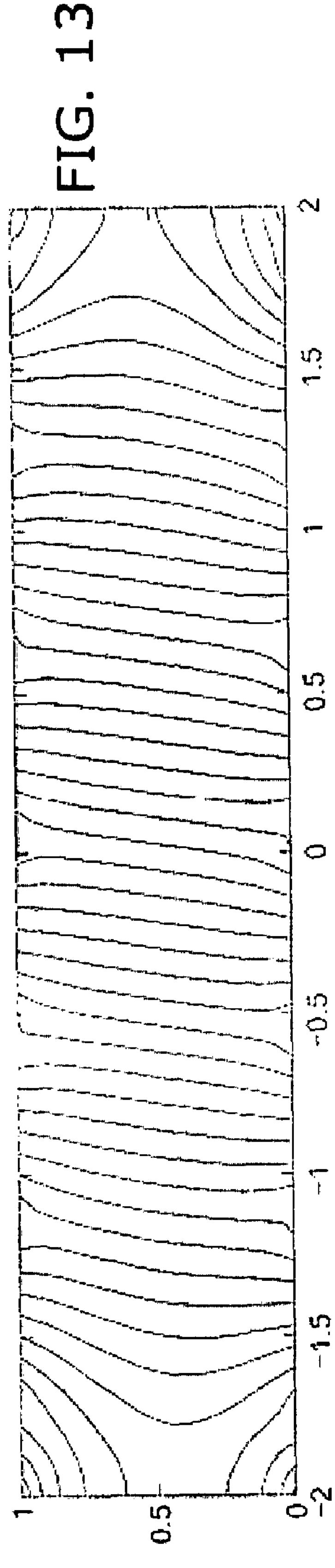
FIGS. 13, 14, and 15 are three contour graphs depicting the electric potential V and the level lines of the components $E_x$ and $E_y$ of the electric field (E) respectively in the section of the control volume ($V_c$) depicted in FIG. 1. Said representations correspond to the same case than FIGS. 10, 11, and 12.
Figure 14:
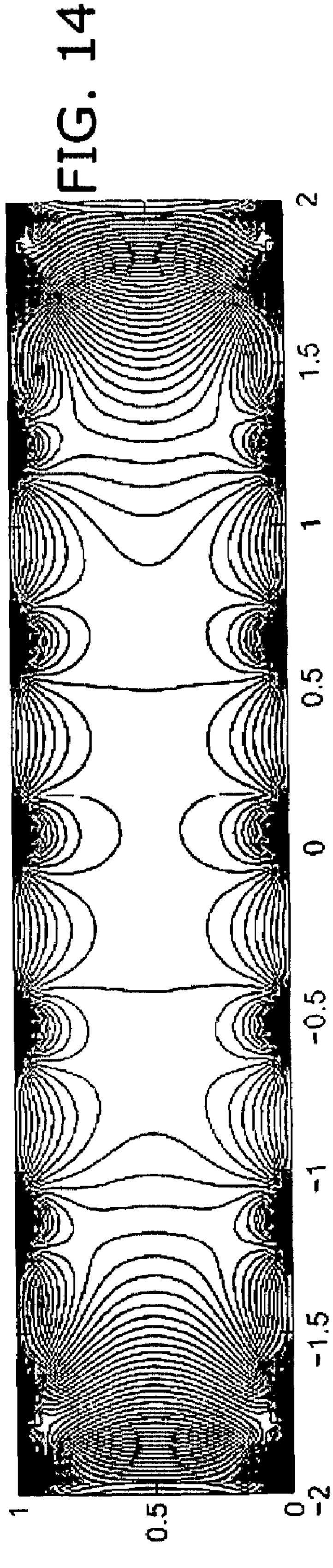
Figure 15:
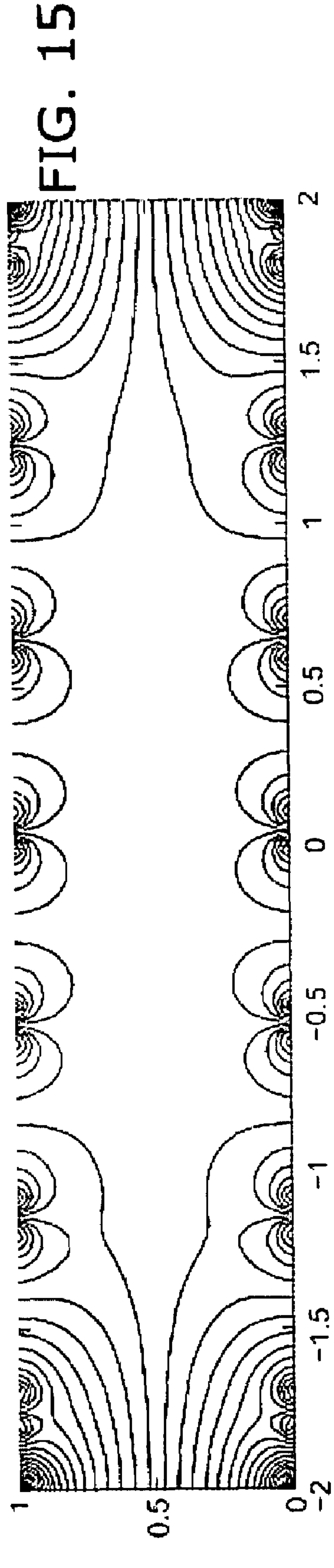

These same graphs 11 and 12 are depicted as contour diagrams in FIGS. 14 *y* 15, the same disturbances in the regions close to the faces ($S_1$, $S_2$) and almost the lack of lines in the inner region being observed. As intended, this inner region is that providing the oblique field lines. FIG. 13 is that showing the lines of electric potential (V) with disturbances both at the entry and exit of the drag flow (v) and at the faces ($S_1$, $S_2$).

Figure 16:
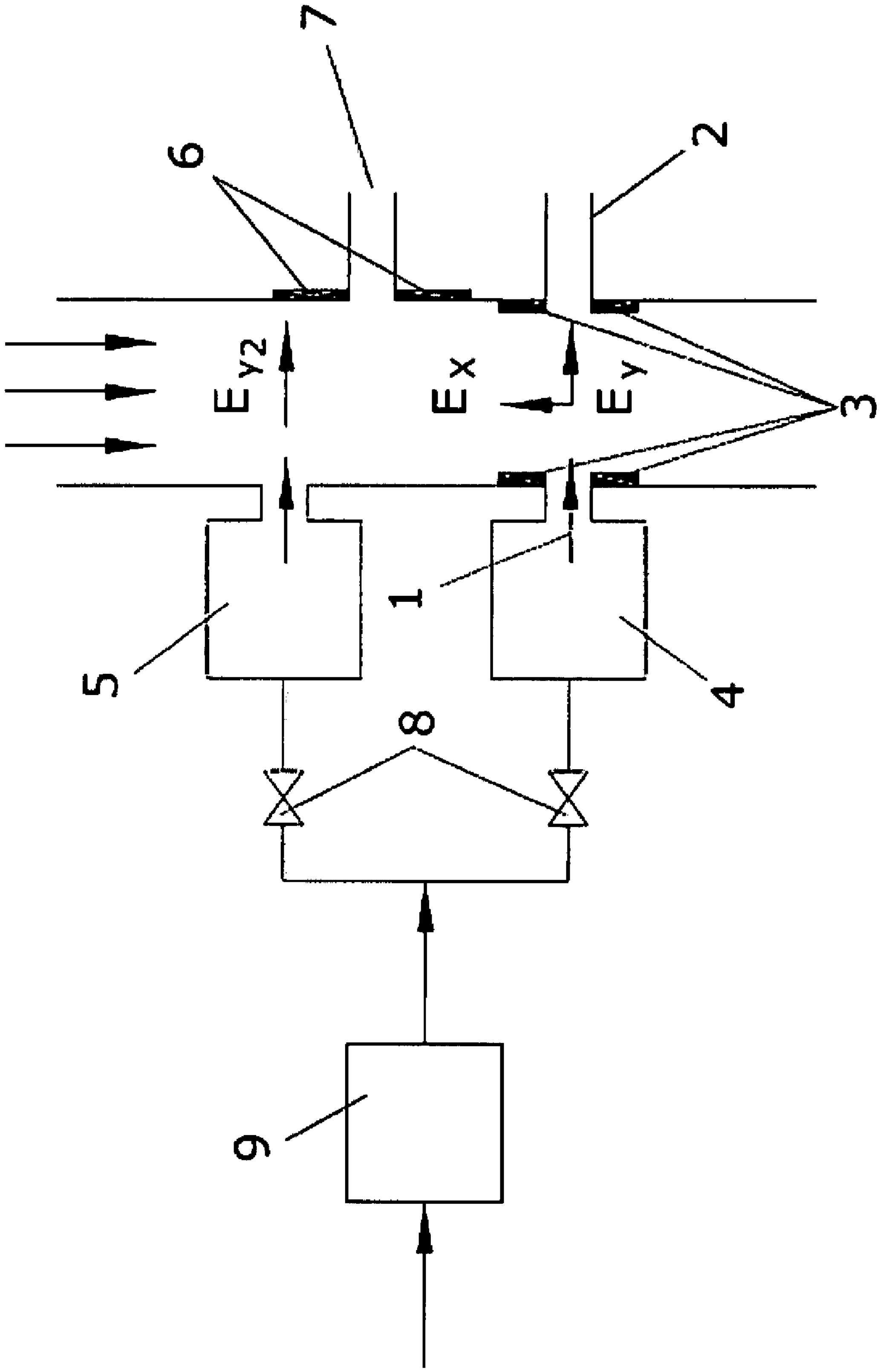
FIG. 16 is a diagram depicting the configuration of a device utilizing a high-resolution analyzer like that of the invention integrated together with an analyzer of the state of the art so as to operate jointly.

FIG. 16 depicts a complex device wherein one of its components is an embodiment of the invention. On the left of the diagram a ionization stage (9), common to all DMAs, is depicted. The ionized particles may follow two possible trajectories determined by two throttle valves (8), on carrying a DMA of the state of the art and another lower one carrying a DMA such as that of the present invention.

The DMA used in the state of the art utilizes an injector (5) which introduces a charged particle inside the drag flow (v). A second transverse component $E_{y2}$, that is its longitudinal component is zero, is used in this DMA.

At the wall opposite to the injector (5) there is a multisensor (6), together with its lower exit slot (7), that allows to simultaneously detect different particles. Upon detecting a target particle (P), the decision of whether said substance is really in the flow crossing the ionizator (9) with a greater confidence level arises.

For this purpose, the flow is diverted through the valves (8) toward the downwardly arranged DMA of the present invention. Once the particles are introduced by means of its injector (5), it is seen that they are subject to oblique electric field (E) with a non-zero component $E_x$. The result is a measurement with a greater resolution level for the reading of particles with a predetermined electric mobility. This second DMA according to the invention has its exit slot (2) also differentiated from the lower exit slot (7) of the classic DMA.

Figure 17:
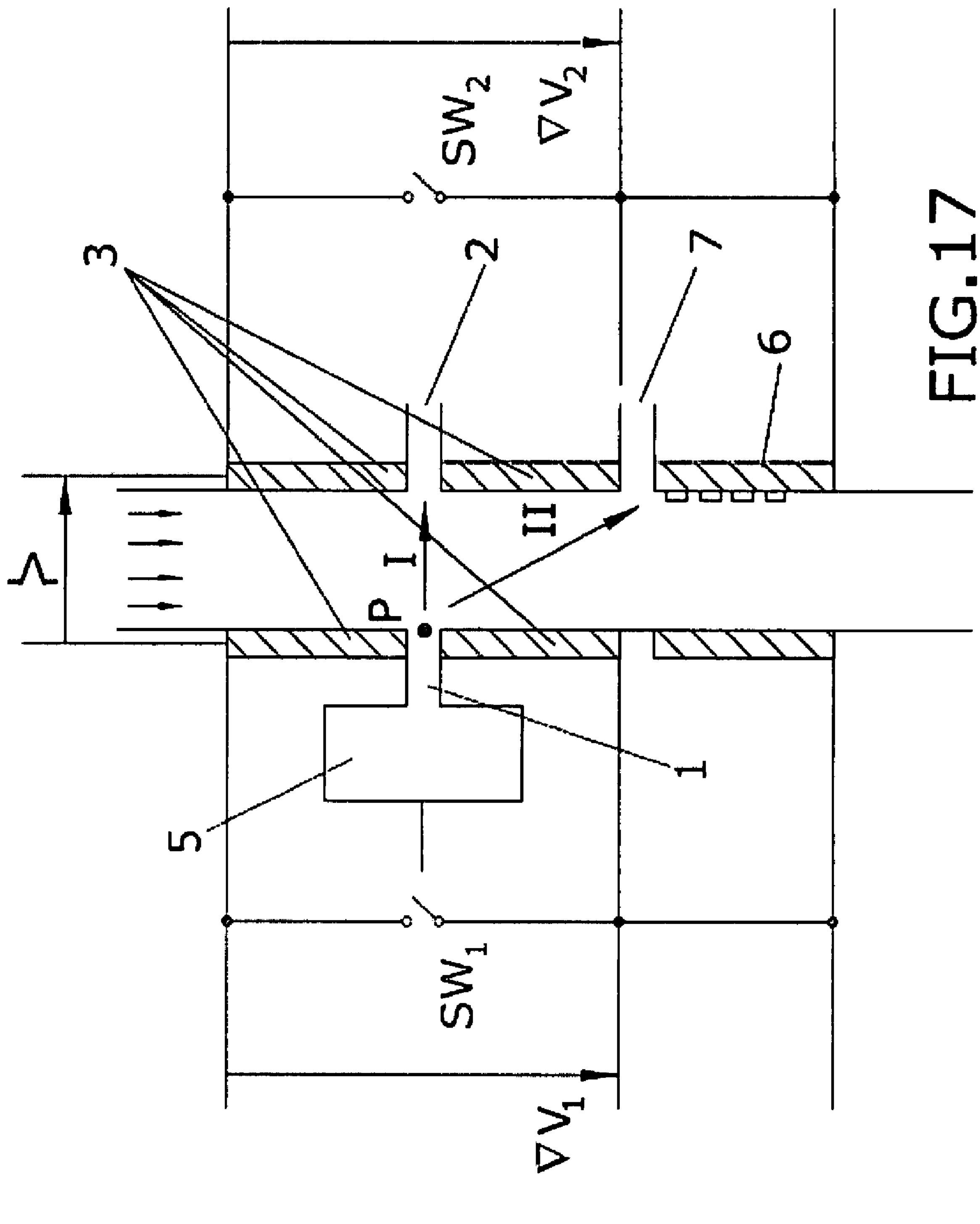
FIG. 17 shows another possible parallel configuration of two analyzers integrated in the same body.

Another possible parallel configuration of the two analyzers integrated in the same body is shown in FIG. 17. In this case, a single injection slot (1), which is common to both devices, is utilized. The selection of one analyzer or the other is carried out by means of the connection or disconnection of the electrodes (3).

It is seen in the figure that there are two switches ($SW_1$, $SW_2$) which join the ends of the electrodes (3), which in this case are made up of resistive material and thus are continuous. The joining of these ends entails that when the switch is open, the supply at one and the other side, with the potential difference (V) between one side and the other as well as the potential gradient ($\nabla V_1$, $\nabla V_2$) along each conductor (3), gives rise to conditions as those considered in the description of the DMA according to the invention with an oblique electric field (E).

Upon closing the switches, the ends are short-circuited, eliminating the potential drop along the conductors (3.1), but the potential difference between the conductors (3.1) located at one and the other side is not cancelled.

As a result, the switches ($SW_1$, $SW_2$) in the open position give rise to an oblique electric field (E) DMA, and the closed switches (SW1, SW2) restore the conditions of a classic DMA.

The change from one to another would give rise to a target particle (P) that would execute the trajectory (I) ending at the upper exit slot (2) if the switches (SW1, SW2) are in the open position, and thus said particle (P) would be under an oblique electric field (E).

For the same reason, the particle (P) would execute the trajectory (II) ending at the lower slit (7) if the switches (SW1, SW2) are in the closed position, and thus said particle (P) would be under a transverse electric field (E) perpendicular to the flow.

It is to be emphasized that the exit slots (2, 7), corresponding to an oblique field (E) or not, are swapped in FIGS. 16 and 17 since the conditions of the oblique field (E) when the two analyzers are integrated in a single body may give rise to this situation.

Heretofore configurations of continuous and discontinuous electrodes (3) have been envisaged so as to define an oblique electric field (E) that improves the reading of particles with an certain electric mobility, those exiting through the upper exit slit (2).

It has been observed that the electrodes (3) with a continuous potential gradient give rise to electric fields (E) of a higher quality; nevertheless, the electrodes (3) corresponding to the discrete case may be an alternative for incorporating multisensors which also confer a greater flexibility to the device. This incorporation is possible on the insulating material (3.2) set forth which is interposed between consecutive electrodes (3). Thus, the better resolution of the DMA is combined with the simultaneous reading of more than one electric mobility.

In this case, the higher resolution in the reading will also impose smaller sizes of passage between the insulator (3.2) and the conductor (3.1) which in turn will give rise to more homogeneous potential gradients (V).

The invention claimed is:

1. A differential mobility analyzer, wherein a control volume ($V_c$) limited by sidewalls is defined and wherein at least there is:

- a main drag flow (v),
- a particle injection point or injection slot (1) through a side face ($S_1$), and
- a target particle upper exit slot (2) or linear detection sensor on an opposite face ($S_2$)

characterized in that electrodes (3) are incorporated on the faces ($S_1$, $S_2$) where each one of them has a potential gradient (∇V **[*1)**) in the direction of the main flow (v) and between them a potential difference (U) such that electric field (E) in the inner volume ($V_i$) [*2]is oblique, with a transverse component ($E_y$) transverse to the main flow (v), in the direction taken from the side face ($S_1$) where the injection is carried out and oriented toward the opposite face ($S_2$), and another non-zero component ($E_x$) parallel and in the direction opposite to the main flow (v).

2. A differential mobility analyzer according to claim 1, characterized in that the potential gradient (∇V)[*3]any of the electrodes (3) is continuous.

3. A differential mobility analyzer according to claim 2, characterized in that the potential gradient (∇V) is obtained by utilizing a resistive material.

4. A differential mobility analyzer according to claim 2, characterized in that the electrode (3) is a part housed in a mortise.

5. A differential mobility analyzer according to claim 2, characterized in that the electrode (3) is obtained by projecting or depositing a resistive material on the surface where it is located.

6. A differential mobility analyzer according to claim 1, characterized in that the potential gradient (∇V) in any of the electrodes (3) is discrete.

7. A differential mobility analyzer according to claim 6, characterized in that a discrete potential gradient (∇V) is obtained by means of a plurality of conductors (3.1) separated from one another by insulators (3.2), wherein each of these conductors (3.1) is adequately electrically fed.

8. A differential mobility analyzer according to claim 7, characterized in that the power supply of each of the conductors (3.1) is carried out by means of a voltage divider.

9. A differential mobility analyzer according to claim 7, characterized in that the power supply of each of the conductors (3.1) is carried out by means of independent power supplies.

10. A differential mobility analyzer according to claim 7, characterized in that sensors forming part of a multisensor are arranged on the insulators (3.2).

11. A differential mobility analyzer according to claim 1, characterized in that the potential gradient (∇V) on any of the electrodes (3) is constant along the coordinate parallel to the drag flow (v).

12. A differential mobility analyzer according to claim 1, characterized in that the potential gradient (∇V) on any of the electrodes (3) is variable along the coordinate parallel to the drag flow (v).

13. A differential mobility analyzer according to claim 1, characterized in that the electric field (E) has regions with convergent or divergent field lines.

14. A differential mobility analyzer according to claim 12, characterized in that the potential gradient variable along the coordinate parallel to the drag flow (v) is obtained by varying the section of the resistive material.

15. A differential mobility analyzer according to claim 12, characterized in that the potential gradient variable along the coordinate parallel to the drag flow (v) is obtained by varying the properties of the resistive material.

16. A differential mobility analyzer according to claim 12, characterized in that the potential gradient (∇V) in one and the other electrode (3) is identical.

17. A differential mobility analyzer device made up of a classic differential mobility analyzer with an electric field (E) perpendicular to the transverse drag flow (v) and a differential mobility analyzer according to any of the preceding claims, characterized in that both analyzers are arranged in parallel.

18. A differential mobility analyzer device according to claim 17, characterized in that both analyzers share the main drag flow (v).

19. A differential mobility analyzer device according to claim 17, characterized in that both analyzers share the ionized particle injector (5).

20. A differential mobility analyzer device according to claim 17, characterized in that which analyzer of the two that make it up is fed is determined by means of valves (8).

21. A differential mobility analyzer device according to claim 17, characterized in that the two analyzers are integrated in the same body.

22. A differential mobility analyzer device according to claim 21, characterized in that which analyzer of the two that make it up is fed is determined by means of connecting or disconnecting the respective electrodes (3).

23. A differential mobility analyzer device according to claim 21, characterized in that whether the analyzer utilizes the oblique component of the electric field (E) is determined by means of short-circuiting the ends of the electrodes (3).

24. A differential mobility analyzer device according to claim 21, characterized in that the exit slots (2, 7) are arranged such that upper exit slot (2) corresponding to the existence of an oblique component of the non-zero component ($E_x$ [*4]) is arranged above or upstream of lower exit slot (7 [*5] corresponding to a transverse component ($E_y$) without an oblique component because of the short-circuiting of the electrodes (3).

25. A differential mobility analyzer device according to claim 17, characterized in that the classic differential mobility analyzer utilizes a multisensor.

* * * * *